(12) United States Patent
Tanaka

(10) Patent No.: US 7,679,797 B2
(45) Date of Patent: *Mar. 16, 2010

(54) HOLOGRAM AND HOLOGRAPHIC VIEWING DEVICE INCORPORATING IT

(75) Inventor: Akiko Tanaka, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/764,799

(22) Filed: Jun. 18, 2007

(65) Prior Publication Data

US 2008/0180766 A1 Jul. 31, 2008

Related U.S. Application Data

(63) Continuation of application No. 11/238,630, filed on Sep. 28, 2005, now Pat. No. 7,301,683.

(30) Foreign Application Priority Data

Sep. 28, 2004 (JP) ............................. 2004-281359
Jul. 29, 2005 (JP) ............................. 2005-220892

(51) Int. Cl.
*G03H 1/30* (2006.01)
(52) U.S. Cl. ................................ 359/25; 359/9; 359/29; 351/51
(58) Field of Classification Search ............ 359/9, 359/22, 25, 29; 351/51
See application file for complete search history.

(56) References Cited

U.S. PATENT DOCUMENTS 5,546,198 A * 8/1996 van der Gracht et al. ........ 359/1
6,452,699 B1 9/2002 Athale et al.
6,927,748 B2 8/2005 Hughes et al.
7,068,403 B2 6/2006 Kitamura

FOREIGN PATENT DOCUMENTS

JP 10-282870 10/1998
JP 2004-126535 4/2004

* cited by examiner

*Primary Examiner*—Stephone B Allen
*Assistant Examiner*—Jennifer L. Doak
(74) *Attorney, Agent, or Firm*—patenttm.us

(57) ABSTRACT

The invention relates to a hologram that enables two or more different images to be simultaneously reconstructed even in a state where the hologram is fixed in terms of relative position with respect to an eye, and a holographic viewing device that incorporates it. The hologram 14 is fabricated by applying Fourier transform to a plurality of input image to obtain a plurality of corresponding Fourier transform images 13-1, 13-2 and arraying the Fourier transform images 13-1, 13-2 on the same plane according to a given two-dimensional array principle into a computer-generated hologram. When a plurality of point light sources $23_1$ to $23_9$ located behind the hologram 14 are viewed through the hologram 14, a plurality of images are simultaneously and parallel reconstructed (28) in correspondence to the array positions of the plurality of Fourier transform images.

9 Claims, 16 Drawing Sheets

FIG. 1(a)

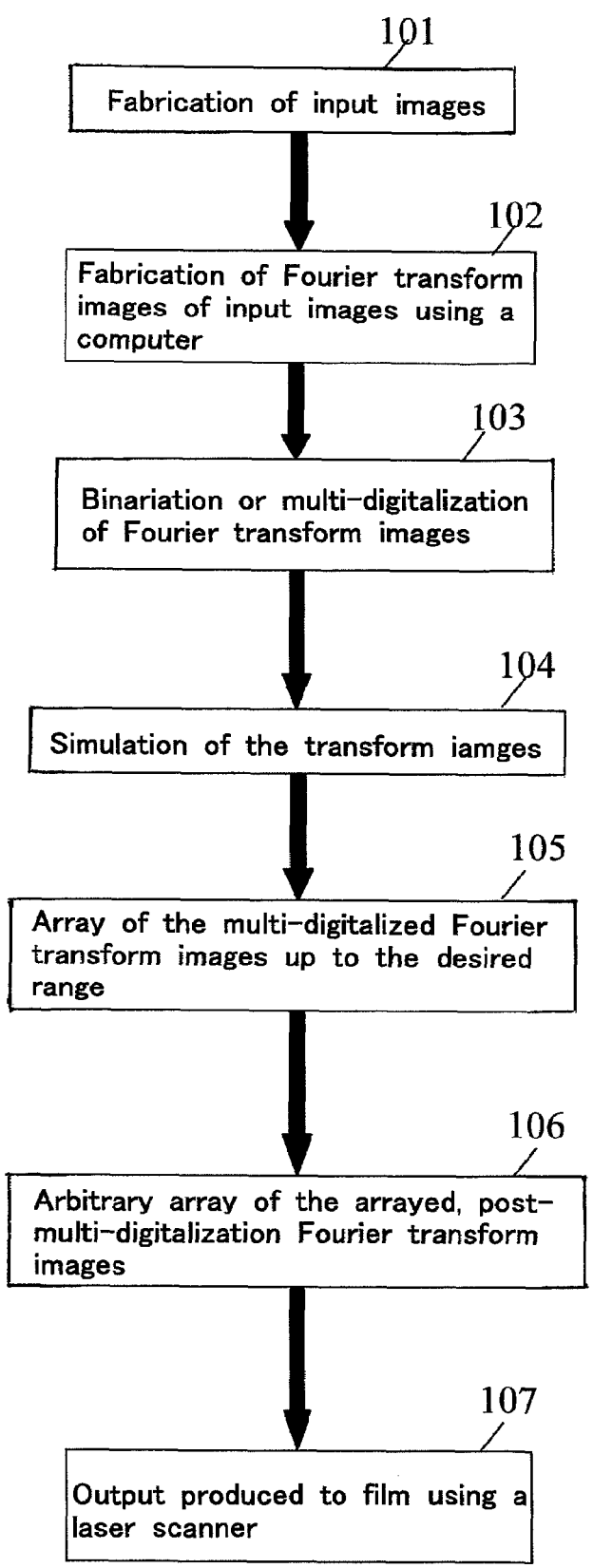

- 101 Fabrication of input images
- 102 Fabrication of Fourier transform images of input images using a computer
- 103 Binariation or multi-digitalization of Fourier transform images
- 104 Simulation of the transform iamges
- 105 Array of the multi-digitalized Fourier transform images up to the desired range
- 106 Arbitrary array of the arrayed, post-multi-digitalization Fourier transform images
- 107 Output produced to film using a laser scanner

FIG. 1(b)

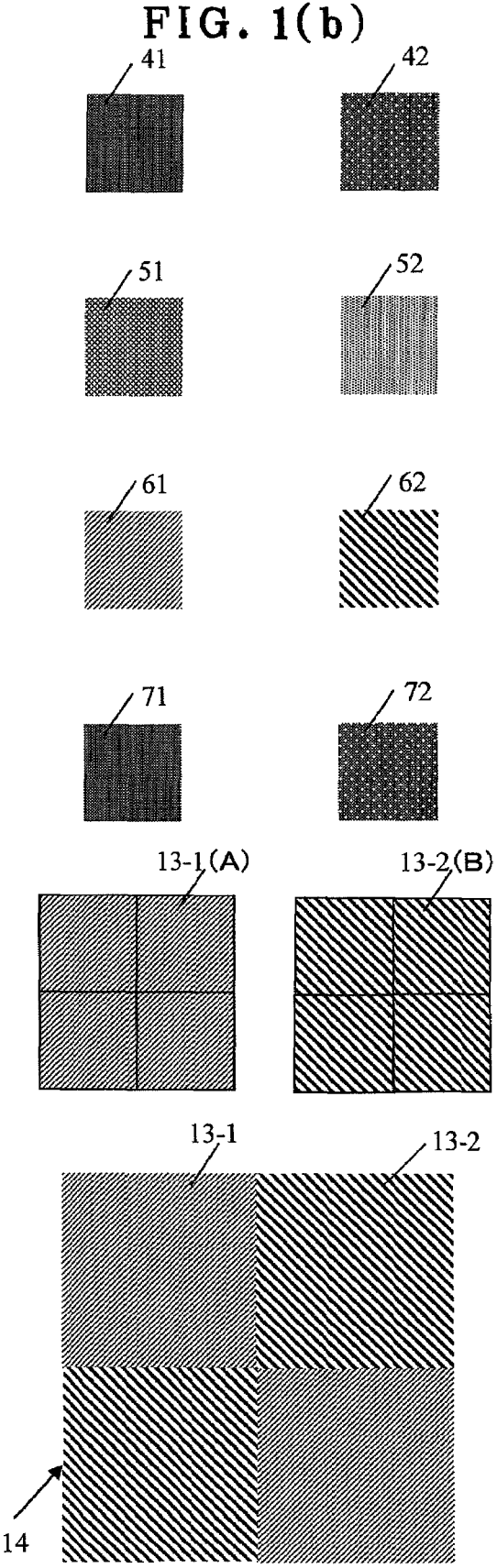

FIG. 7
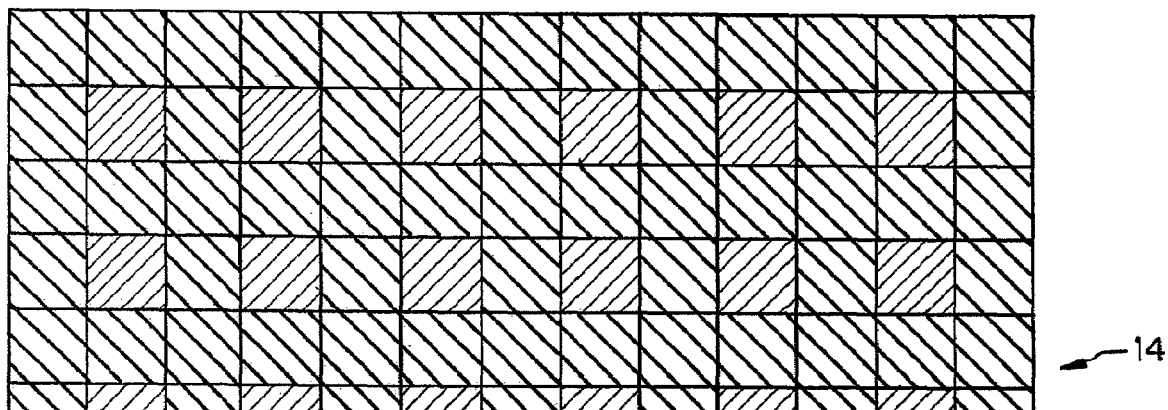
 Unit hologram A patterns of input image a
 Unit hologram B patterns of input image b FIG. 9(a)
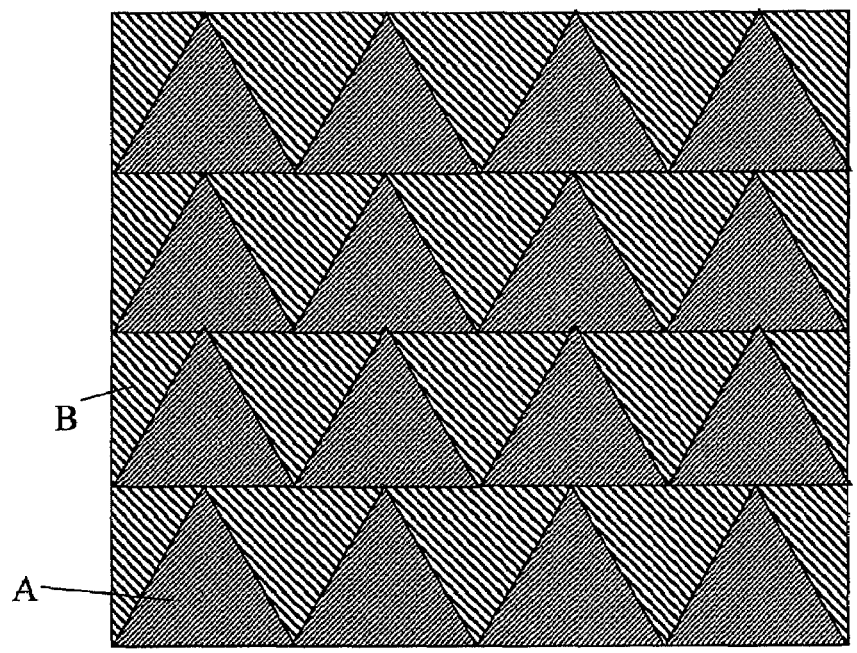
FIG. 9(b)
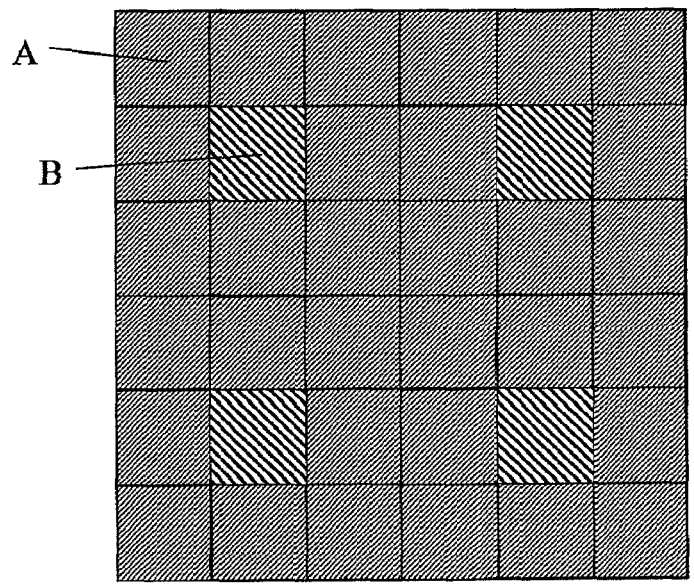
 Unit hologram A patterns of input image *a*
 Unit hologram B patterns of input image *b*

▨ Unit hologram A patterns of input image *a*

▧ Unit hologram B patterns of input image *b*

▨ Unit hologram A patterns of input image a

▨ Unit hologram B patterns of input image b

▨ Unit hologram A patterns of input image <u>a</u>

◩ Unit hologram B patterns of input image <u>b</u>

▦ Unit hologram C patterns of input image <u>c</u>

FIG. 13
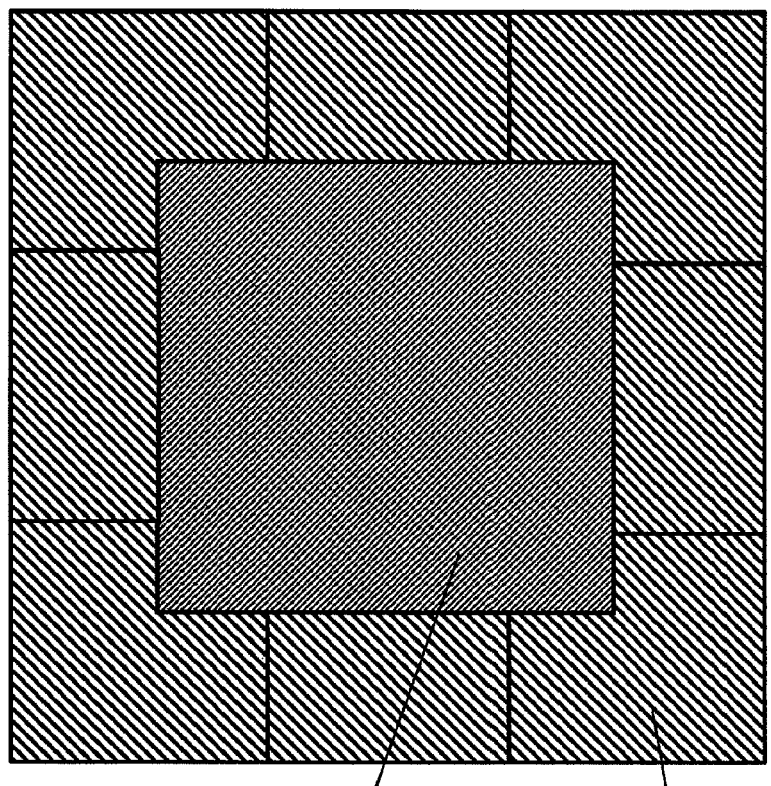
A   B
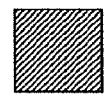 Unit hologram A patterns of input image a
 Unit hologram B patterns of input image b FIG. 16(a)
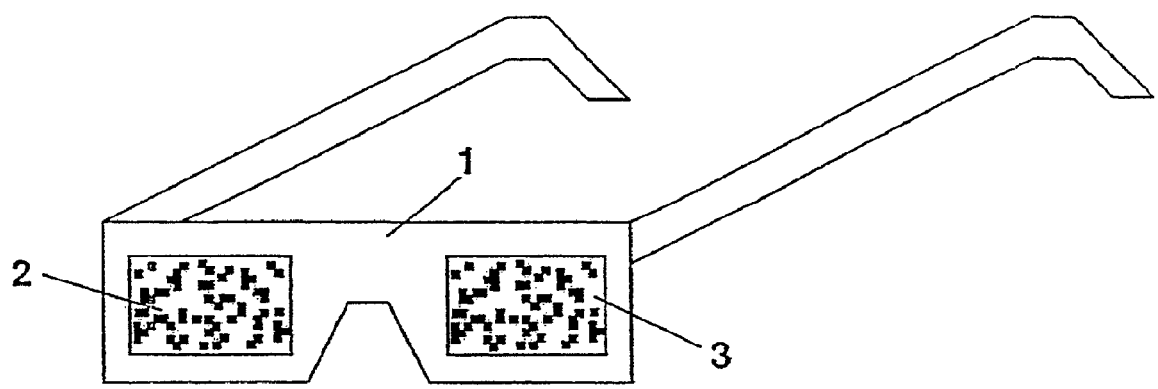
FIG. 16(b)        FIG. 16(c)
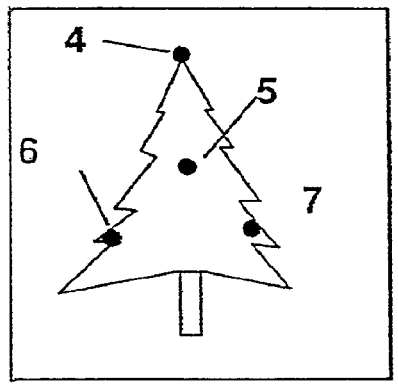   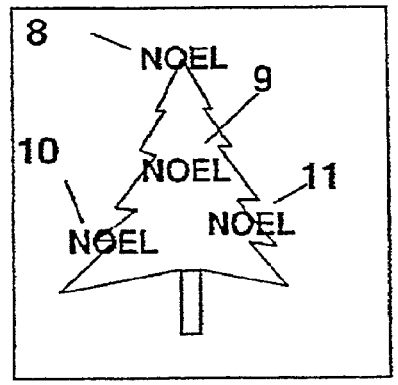

HOLOGRAM AND HOLOGRAPHIC VIEWING DEVICE INCORPORATING IT

CROSS-REFERENCE TO RELATED APPLICATIONS

This application is a continuation of U.S. patent application Ser. No. 11/238,630, filed Sep. 28, 2005, now U.S. Pat. No. 7,301,683, issued Nov. 27, 2007.

BACKGROUND OF THE INVENTION

The present invention relates generally to a hologram and a holographic viewing device incorporating it, and more particularly to a holographic viewing device with a built-in computer-generated hologram set up in the form of a transmission type Fourier transform hologram.

Patent Publication 1 comes up with holographic eyeglasses constructed as shown in the perspective view of FIG. 16(a). More specifically, two transmission type holograms 2 and 3 are fitted in a binocular framework of an eyeglass frame 1. As a scene containing light sources 4, 5, 6 and 7, each of small area, as shown in FIG. 16(b), is viewed with the eyeglasses using the transmission type holograms 2 and 3, for instance, it looks as shown in FIG. 16(c). In other words, it looks as if the small-area light sources 4, 5, 6 and 7 in the actual scene of FIG. 16(b) were replaced with pre-selected words "NOEL" 8, 9, and 11, respectively. For the transmission holograms 2 and 3 having such features, Fourier transform (Fraunhofer) holograms having the aforesaid words "NOEL" are used in the form of computer-generated holograms.

A little more explanation is given of the transmission holograms 2 and 3. Suppose now that transmission type hologram 21 stands for the transmission type holograms 2 and 3, and a (small-area) point light source 23 is located behind the transmission type hologram 21, as shown in FIG. 14(a). Then, as the point light source 23 is viewed with an eye 22 through the transmission type hologram 21, one image is reconstructed corresponding to the point light source 23 behind that transmission type hologram 21. FIG. 14(b) is a plan view of a unit hologram 24 that forms a part of the transmission type hologram 21. As shown, nine element holograms $24_1$, each comprising a transmission type Fourier transform hologram, are lined up parallel with one another into the unit hologram 24, and the transmission type hologram 21 is assembled by arranging a multiplicity of such unit holograms 24 in rows and columns. FIG. 14(c) is illustrative of one exemplary reconstructed image 25 reconstructed upon viewing the point light source 23 through the transmission type hologram 21, which corresponds to the word "NOEL" in FIG. 16(b). In this case, the image has a crescent form.

As many images as the point light sources are reconstructed through the transmission hologram 21 comprising such unit holograms 24 as shown in FIG. 14(b) (=FIG. 15(b)). As nine point light sources $23_1$ to $23_9$ located behind the transmission hologram 21 are viewed through the transmission hologram 21 as shown typically in FIG. 15(a), it allows an image with nine identical (crescent) images lined up in rows and columns to be reconstructed and seen.

On the other hand, Patent Publication 3 proposes that a plurality of unit holograms 24 for reconstructing mutually different images are parallel arranged into a transmission type hologram, and the position of an eye with respect to that transmission type hologram is so varied that a single image differing depending on the light sources behind that transmission type hologram is reconstructed.

Patent Publication 1
U.S. Pat. No. 5,546,198
Patent Publication 2
JP (A) 2004-126535
Patent Publication 3
JP(A)10-282870

However, such transmission type holograms as briefed above are shy of variations and interest, because, as long as the relative position with respect to the eye is fixed, as many single identical images as point light sources are only reconstructed.

SUMMARY OF THE INVENTION

In view of such problems with the prior art, the primary object of this invention is to provide a hologram that enables two or more varying images to be simultaneously reconstructed even in a state where it is fixed in terms of relative position with respect to an eye, and a holographic viewing device that incorporates it.

According to one aspect of the invention, the aforesaid object is accomplished by the provision of a hologram, characterized by being fabricated by applying Fourier transform to a plurality of input image to obtain a plurality of corresponding Fourier transform images and arraying said Fourier transform images on the same plane according to a given two-dimensional array principle into a computer-generated hologram, and in that when a plurality of point light sources located behind said hologram are viewed through said hologram, a plurality of images are simultaneously and parallel reconstructed in correspondence to the array positions of said plurality of Fourier transform images.

In one preferable embodiment of the invention, said hologram could be of either the phase type (Patent Publication 2) or the amplitude type (Patent Publication 3).

In this embodiment, it is desired that said plurality of Fourier transform images be closely arrayed in a region of given shape on the basis of the two-dimensional array principle.

In another preferable embodiment of the invention, said Fourier transform image corresponding to each input image is arrayed alone or parallel in two or more into a unit hologram corresponding to each input image, and unit holograms corresponding to a plurality of input images are arrayed on the same plane on the basis of a given two-dimensional array principle into a computer-generated hologram.

In yet another preferable embodiment of the invention, it is desired that said plurality of unit holograms be configured into any shape having a maximum diameter of 4 mm to 2L·tan 10° inclusive provided that L is the distance from a viewer's eye to the hologram.

The invention also encompasses a holographic viewing device in which a computer-generated hologram set up as a transmission type Fourier transform hologram is fitted in a frame, wherein said computer-generated hologram is any one of the aforesaid holograms.

According to the invention, it is possible to provide a hologram that enables a plurality of images to be simultaneously and parallel reconstructed even in a state where it is fixed in terms of a relative position with respect to an eye, and a holographic viewing device that incorporates it.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1(a) is a flowchart of one hologram fabrication process according to the invention, and FIG. 1(b) is illustrative in schematic of that flowchart.

FIG. 7 is illustrative of one example of the array of unit hologram patterns, which enables two reconstructed images to be seen at the same time.

FIG. 9 is illustrative of yet another example of the array of unit hologram patterns, which enables two reconstructed images to be seen at the same time.

FIG. 13 is illustrative of exemplary unit holograms of various shapes and sizes usable herein.

FIG. 16 is illustrative of prior art holographic eyeglasses and how they work.

DESCRIPTION OF THE PREFERRED EMBODIMENTS

Figure 2A:
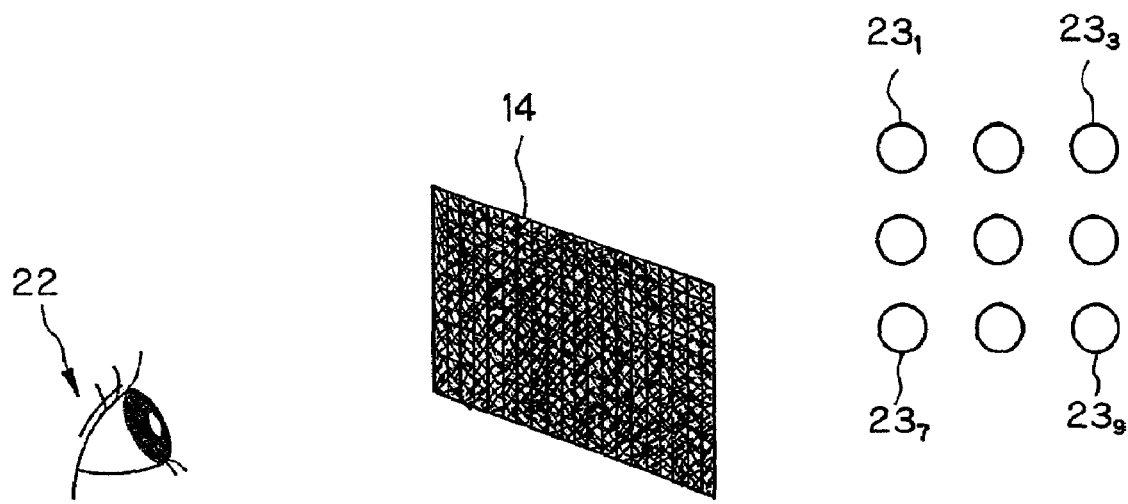
FIG. 2 is illustrative of how to reconstruct images with the hologram fabricated according to FIG. 1.

FIG. 1(a) is a flowchart illustrative of one hologram fabrication process according to the invention, and FIG. 1(b) is illustrative in schematic of that flowchart. First of all, a plurality of input images 41 and 42 are fabricated on a computer (step 101). For instance, the input image 41 has a crescent pattern a, and the input image 42 has a stellar pattern b.

Then, on the computer, Fourier transform is applied to each input image 41, 42 to fabricate a Fourier transform image 51, 52 (step 102). Each Fourier transform image 51, 52 is binarized or multi-digitalized (step 103). In FIG. 1(b), numeral reference 61 is a Fourier transform image that is multi-digitalized in correspondence to the input image 41 (a diffraction optical element; an element hologram), and 62 is a Fourier transform image (a diffraction optical element; and element hologram) that is multi-digitalized in correspondence to the input image 42.

Then, the image to be reconstructed is simulated (step 104). For this simulation, inverse Fourier transform is applied to the multi-digitalized Fourier transform images 61, 62 to obtain the respective Fourier transform images 71, 72, whereby whether or not appropriate processing has occurred at each step is checked out.

Then, each multi-digitalized Fourier transform image (element hologram) 61, 62 is arrayed up to the desired range (step 105). For instance, binarized Fourier transform images 61, 62 are arrayed four per row and column to obtain unit holograms 13-1(A) and 13-2(B).

Then, the unit holograms 13-1 and 13-2 are arrayed on the basis of the given two-dimensional array principle (step 106) to fabricate a computer-generated hologram 14. In the computer-generated hologram 14, the unit holograms 13-1 and 13-2 are lined up in a checker flag pattern, as shown in FIG. 1(b). It is here noted that the two-dimensionally arrayed unit holograms 13-1 and 13-2 are each in a rectangular form.

The thus arrayed computer-generated hologram 14 output is produced onto a film by means of a laser scanner or the like (step 107). Alternatively, that computer-generated hologram 14 could be fabricated by a multi-digitalization technique using a semiconductor fabrication process and etching as set forth in Patent Publication 2.

Figure 2B:
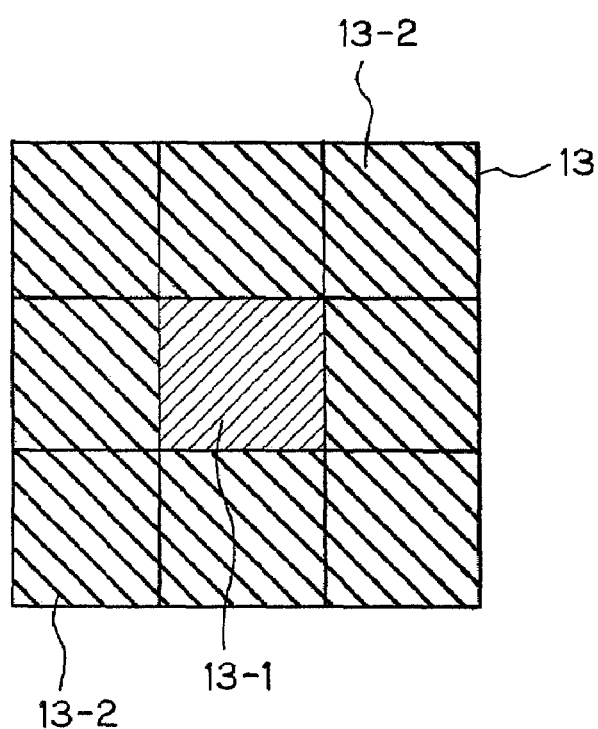
Figure 2C:
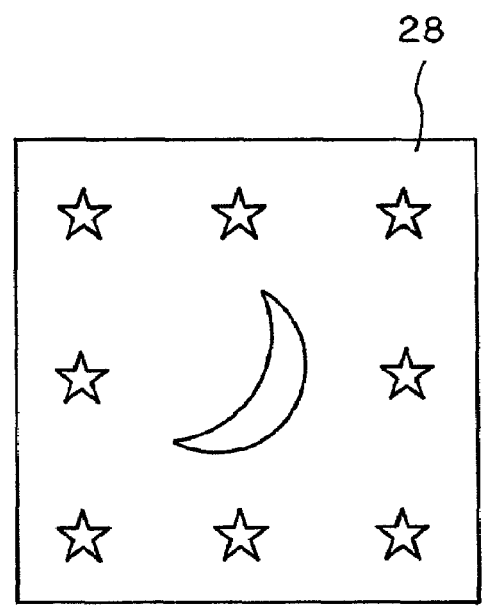

FIG. 2 is illustrative of how to reconstruct images using the thus obtained computer-generated hologram 14. In FIG. 2(a), reference numeral 22 is the eye of a viewer, and $23_1$ to $23_9$ are nine point light sources (of small area). As the hologram 14, behind which the nine point light sources $23_1$ to $23_9$ are located, is viewed with the viewer's eye 22, it allows the viewer to see a reconstructed image 28 in which, as typically shown in FIG. 2(c), a center image a (of crescent pattern) is surrounded with images b (of stellar pattern), corresponding to unit holograms 13-1 and 13-2 (FIG. 2(b)) at positions where straight lines connecting the center of the pupil of the eye 22 with the point light sources cross the hologram 14.

Figure 3:
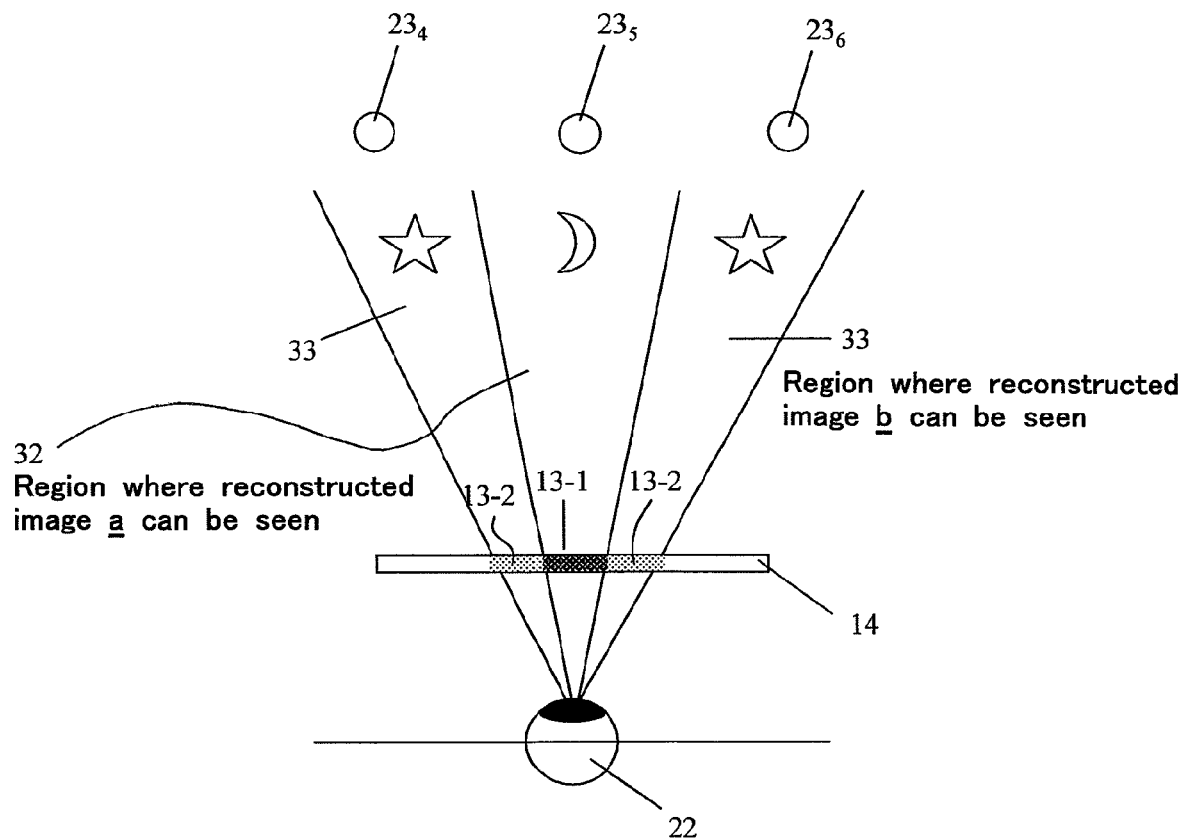
FIG. 3 is illustrative of the positions of point light sources at which each image reconstructed from the hologram can be seen and a region in which each reconstructed image can be seen.

FIG. 3 is illustrative of the position of the point light source where each reconstructed image can be seen from the thus obtained hologram with the left eye or the right eye and a region where each reconstructed image can be seen. In FIG. 3, reference 22 stands for the left eye or the right eye; $23_4$, $23_5$ and $23_6$ indicate the positions of the point light sources where each reconstructed image can be seen; 32 represents a region where the (crescent) reconstructed image a can be seen; and 33 shows a region where the (stellar) image b can be seen. Thus, the viewer can see the (crescent) image a and (stellar) images b reconstructed at the regions corresponding to the unit holograms 13-1 and 13-2 where the straight lines connecting the center of the pupil of the viewer's eye 22 with the point light sources $23_4$, $23_5$ and $23_6$. It is here noted that the unit hologram 13-1 and the unit hologram 13-2 are each composed of one or more element holograms 61 and 62 having a maximum diameter of 4 mm to 2L·tan 10° inclusive where L is the distance from the eye 22 to the hologram 14.

The range of 4 mm to 2L·tan 10° for the maximum diameter of the unit holograms 13-1 and 13-2 is empirically determined through experimentation. The lower limit to the maximum diameter of the unit hologram 13-1, 13-2 is set at 4 mm for the reason that the human eye 22 for use with that hologram 14 has a pupil diameter of about 4 mm. In other words, unless the maximum diameter of the unit hologram 13-1, 13-2 exceeds that pupil diameter of 4 mm, there is then a possibility that the adjacent two unit holograms 13-1 and 13-2 may enter the pupil simultaneously, failing to see the images a and b due to the unit holograms 13-1 and 13-2 at the same time yet in a separate fashion. The upper limit of 2L·tan 10° to the maximum diameter of the unit hologram 13-1, 13-2 could be determined as follows.

Figure 4:
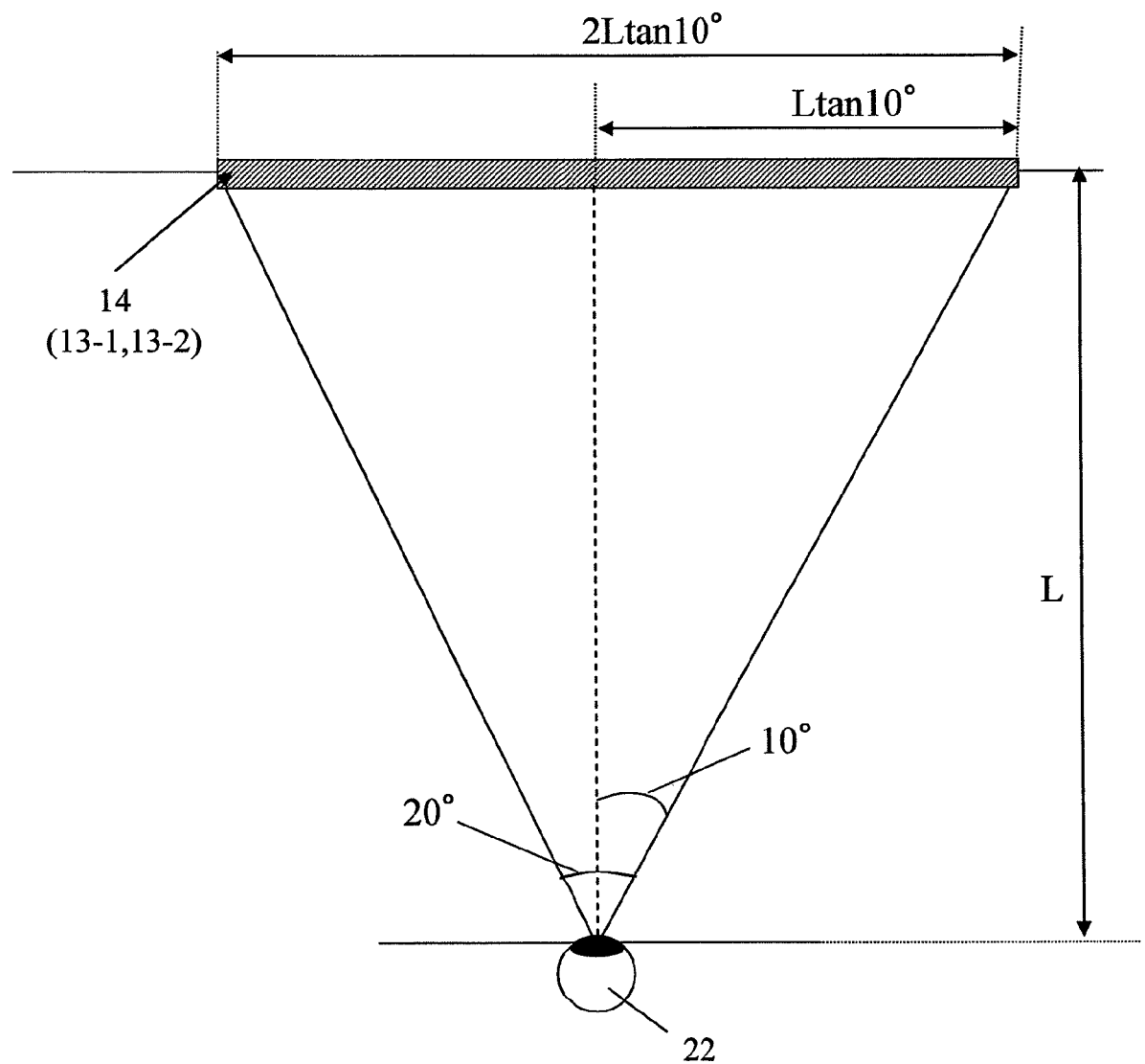
FIG. 4 is illustrative of the one-dimensional direction region of a hologram entering the angle of view of an eye when the hologram—located spaced away from the eye by a given distance—is viewed as shown in FIG. 3.

Simple experimentation shows that the angle of view, at which the human eye 22 can see two mutually spaced objects at the same time with no relative movement, is about 20°. FIG. 4 is illustrative of the one-dimensional direction region of a hologram 14 entering that angle of view when the hologram 14 spaced away from the eye 22 by a distance L is viewed as shown in FIG. 3, indicating that the one-dimensional direction region is given by 2L·tan 10°. FIG. 4 also indicates that to contain at least two unit holograms 13-1 and 13-2 in this range, the upper limit to their maximum diameter is 2L·tan 10°.

Figure 5:
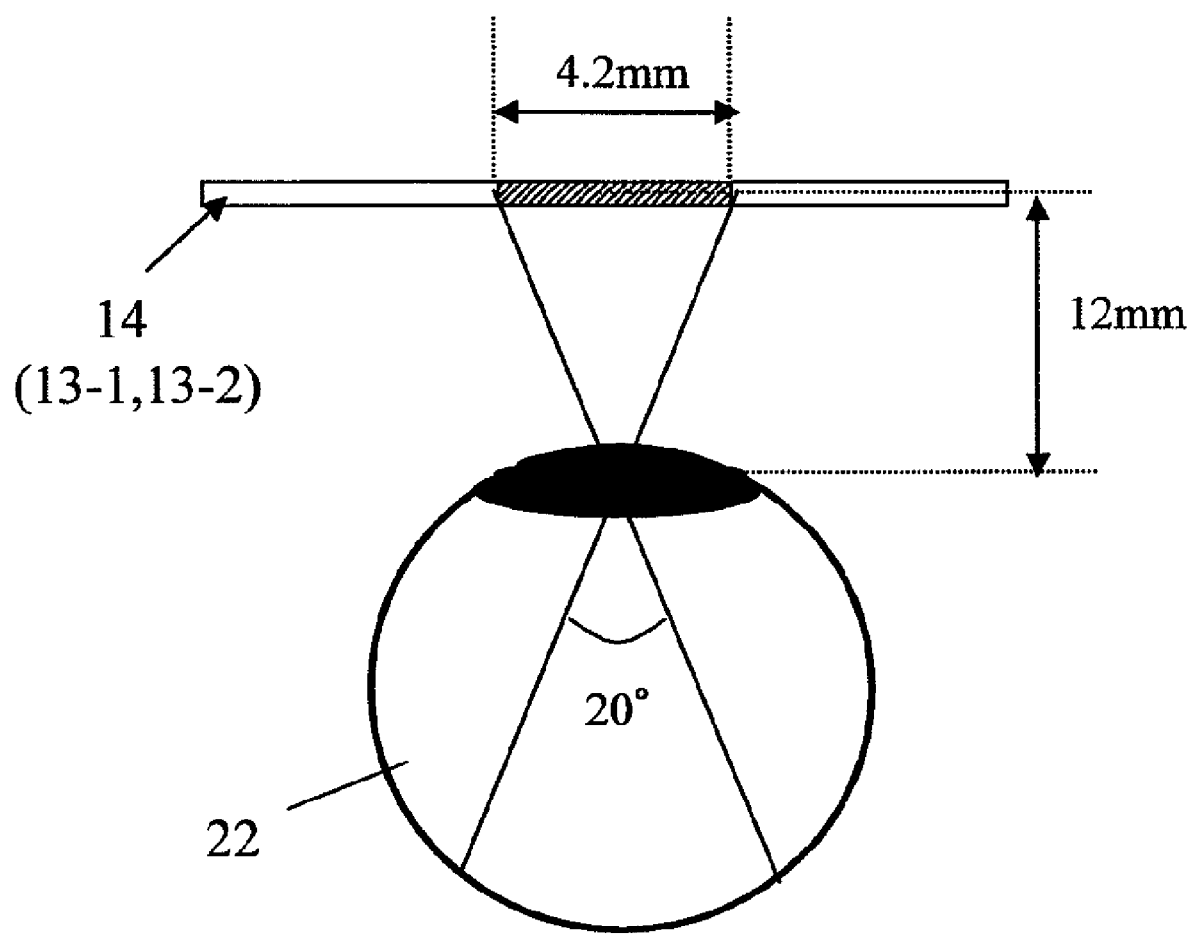
FIG. 5 is illustrative of the maximum diameter of a hologram in a case where the hologram is positioned by fingers in front of the eye.

FIG. 5 is illustrative of a distance L from an eye 22 to a hologram 14 and the upper limit of 2L·tan 10° to the maximum diameter of unit holograms 13-1 and 13-2 in a typical case where the hologram 14 is positioned by fingers in front of the eye 22, indicating that the hologram 14 can be brought to a position about 12 mm before the eye 22; the maximum diameter of the unit holograms 13-1 and 13-2 is in the range of 4.0 to 4.2 mm.

Figure 6:
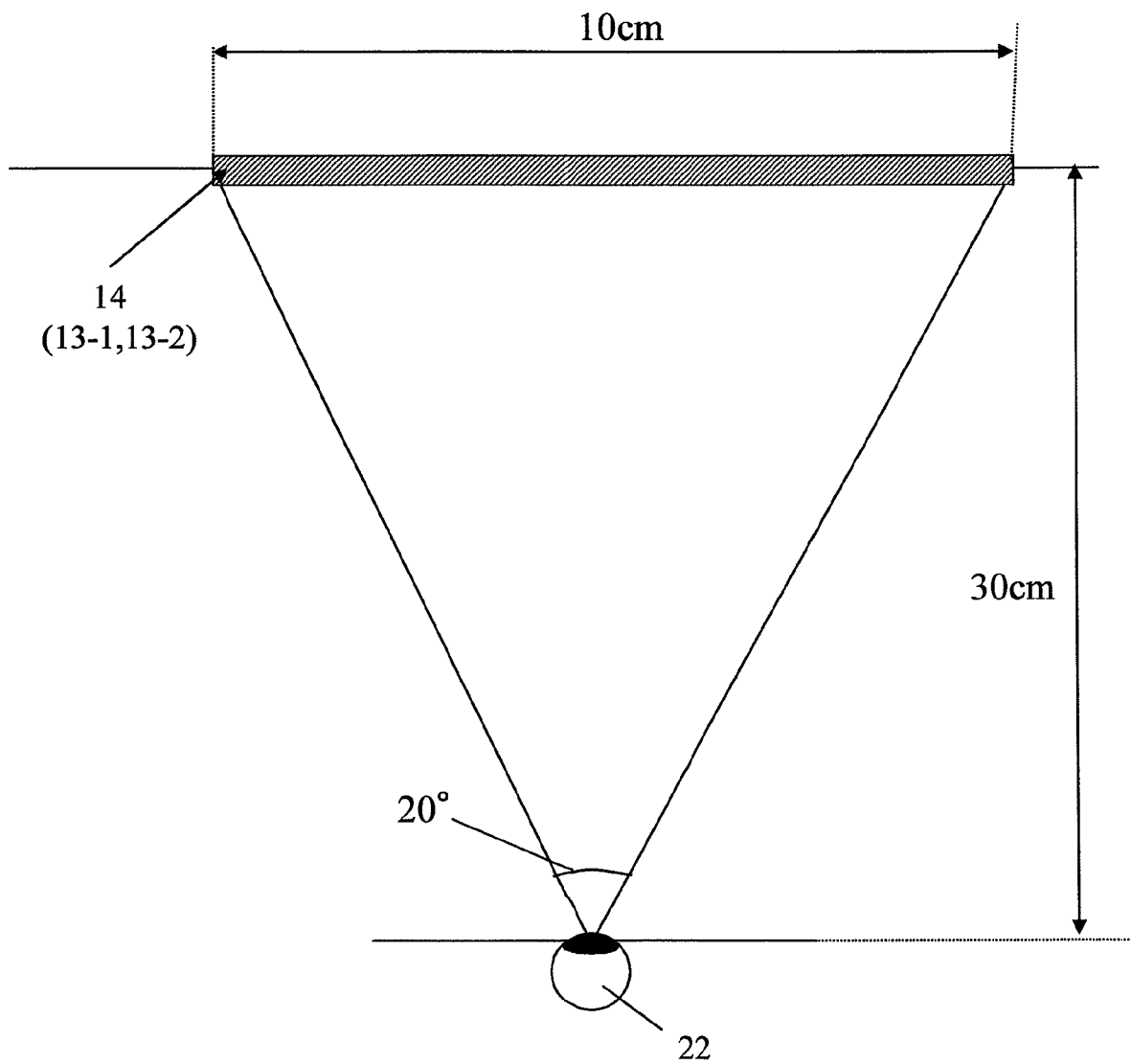
FIG. 6 is illustrative of a distance from an eye to a window glass and the maximum diameter of unit holograms in a typical case where a hologram is applied to the window glass.

FIG. 6 illustrative of a distance L from an eye 22 to a window glass (hologram 14) and the upper limit of 2L·tan 10° to the maximum diameter of unit holograms 13-1 and 13-2 in a typical case where the hologram 14 is applied to the window glass, indicating that the hologram 14 can be placed at a position about 30 cm before the eye 22; the maximum diameter of the unit holograms 13-1 and 13-2 is in the range of 4.0 mm to 10 cm.

From the above considerations, it is found that when the hologram 14 of the invention is used in the form of eyeglasses, window glass or the like while located in front of the eye 22, it is of importance to allow a plurality of unit holograms 13-1 and 13-2 provided in the hologram 14 to be reflected in the retina of the eye 22 simultaneously in a separate fashion. From this, it is desired that one maximum diameter of the unit holograms 13-1 and 13-2 be in the range of 4 mm that is the pupil diameter of the human eye 22 up to the size that enters the angle of view of 20° of the human eye 22, namely, 2L·tan 10° (where L is the distance from the eye 22 to the hologram 14). Otherwise, it will be impossible to view the image a (crescent pattern) and the images b (stellar pattern) at the same time without movement of the eye.

The two-dimensional array principle for unit holograms A (13-1) and B (13-2) in the hologram 14 of the invention is now explained. FIG. 7 is illustrative of an example of the hologram 14 wherein unit hologram A patterns and unit hologram B patterns are lined up in cells, each of square shape, arrayed in a rectangular chessboard form, as in FIG. 2.

Figure 8:
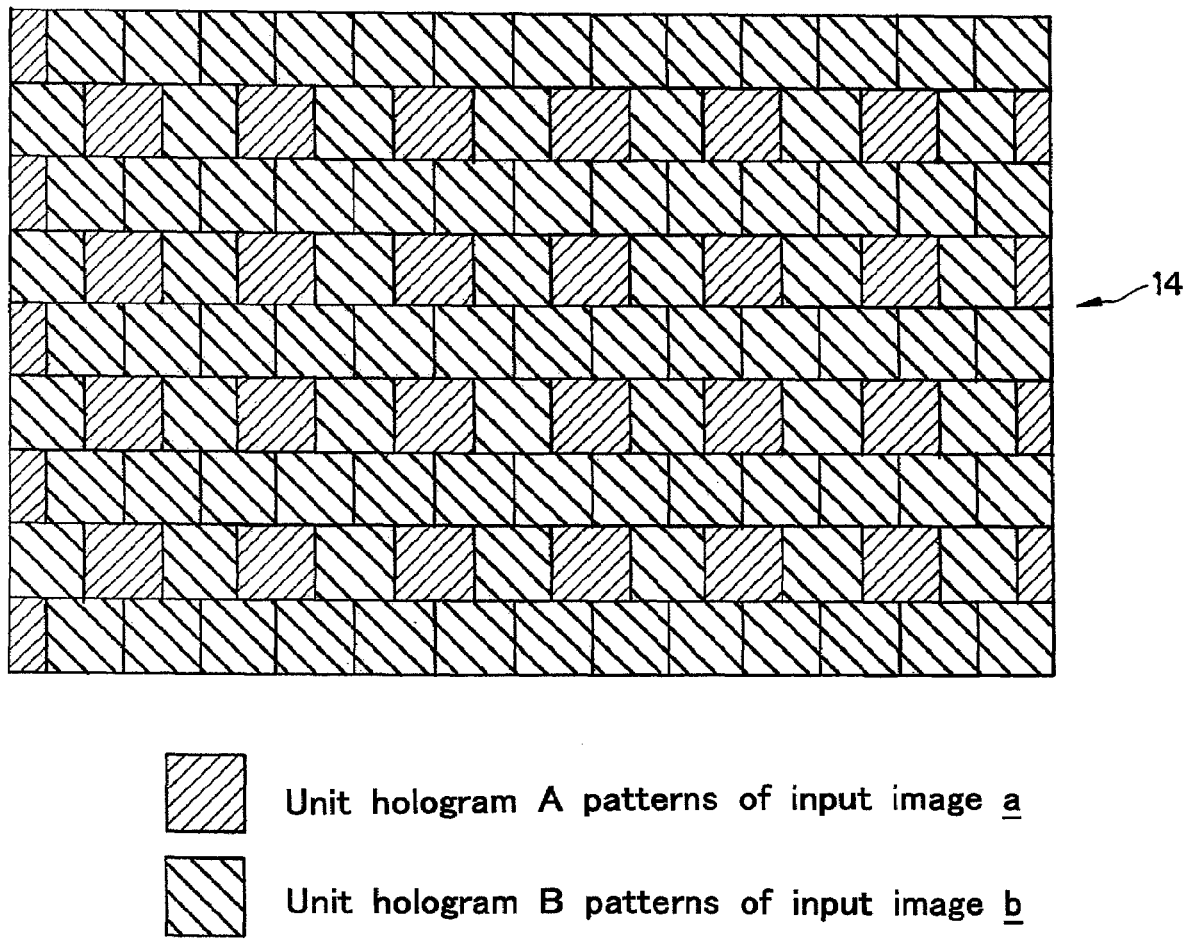
FIG. 8 is illustrative of another example of the array of unit hologram patterns, which enables two reconstructed images to be seen at the same time.

FIG. 8 is illustrative of a possible modification to the array of FIG. 7, wherein every one row is displaced at a half pitch with respect to rows just above and below it.

It is here noted that individual unit holograms could be each of not only rectangular shape but also any desired shape such as triangular or hexagonal shape, some of which are described below.

FIG. 9(*a*) is illustrative of an example of the hologram 14, wherein unit hologram A patterns of erected regular triangle shape and unit hologram B patterns of inverted regular triangle shape are alternately arrayed.

FIG. 9(*b*) is illustrative of a modification to FIG. 7, wherein unit hologram A patterns are located in most of cells, each of square shape, arrayed in a square chessboard form, and unit hologram B patterns are located in cells that are found discretely and regularly in a row-and-column pattern.

Figure 10A:
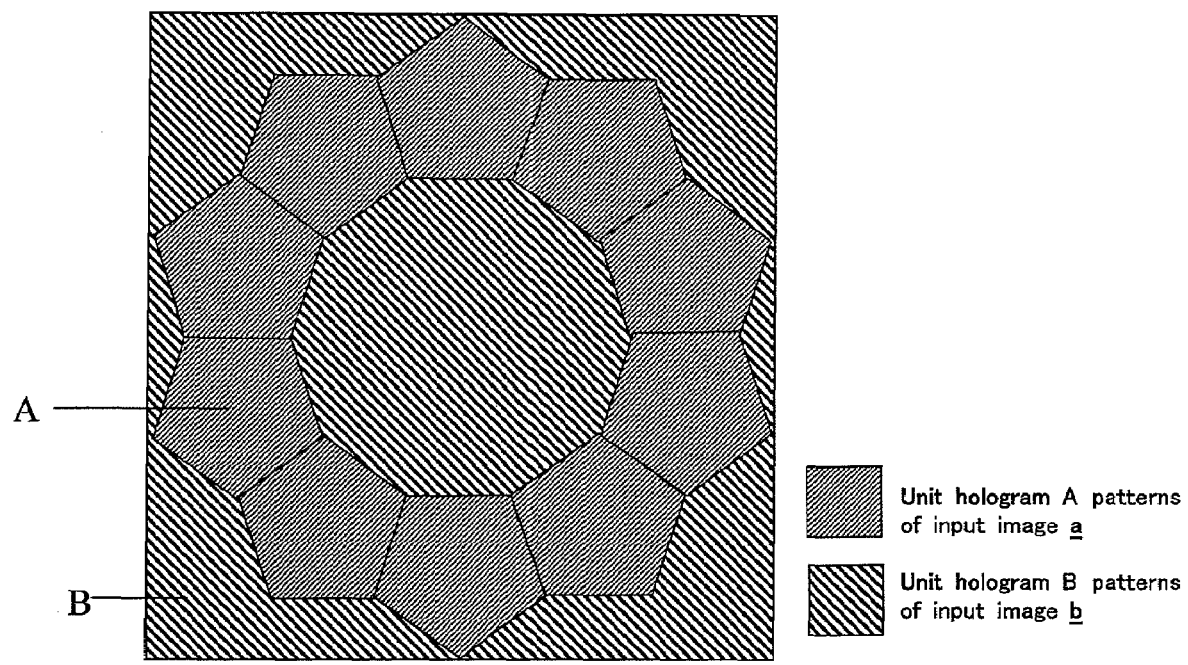
FIG. 10 is illustrative of a further example of the array of unit hologram patterns, which enables two reconstructed images to be seen at the same time.
Figure 10B:
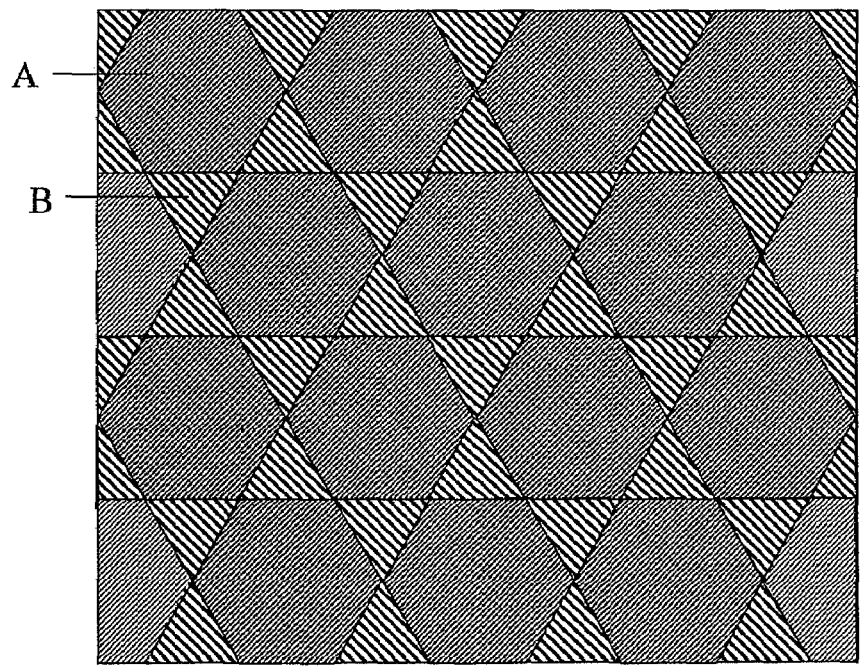

FIG. 10(*a*) is illustrative of an example of the hologram 14, wherein ten unit holograms A of regular pentagon shape are located in an annular form, and unit hologram B patterns are located in cells inside and outside the annular form.

FIG. 10(*b*) is illustrative of an example of the hologram 14, wherein unit holograms A of regular hexagon shape are lined up in 0°, 60° and 120° directions, and a unit hologram B pattern is located in a cell of regular triangle shape between the unit holograms A of regular hexagon shape.

Figure 11A:
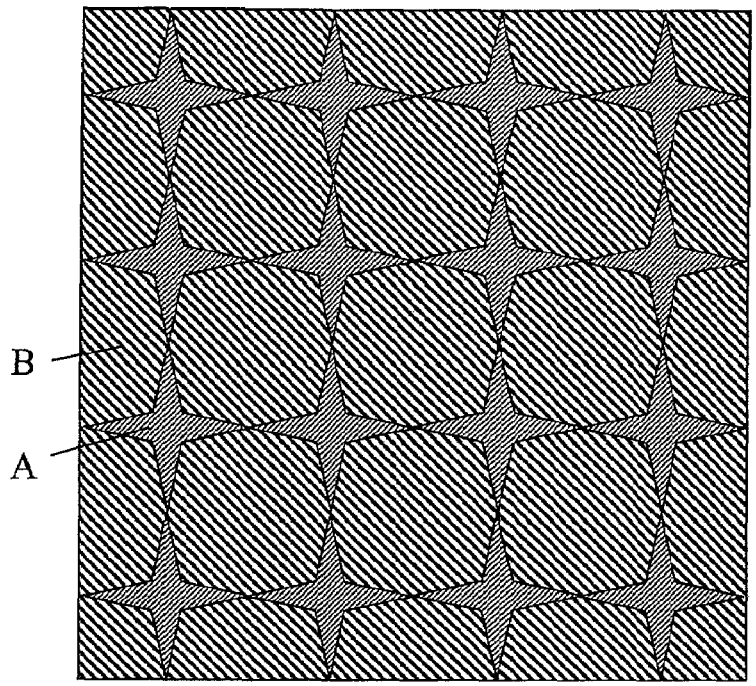
FIG. 11 is illustrative of a further example of the array of unit hologram patterns, which enables two reconstructed images to be seen at the same time.
Figure 11B:
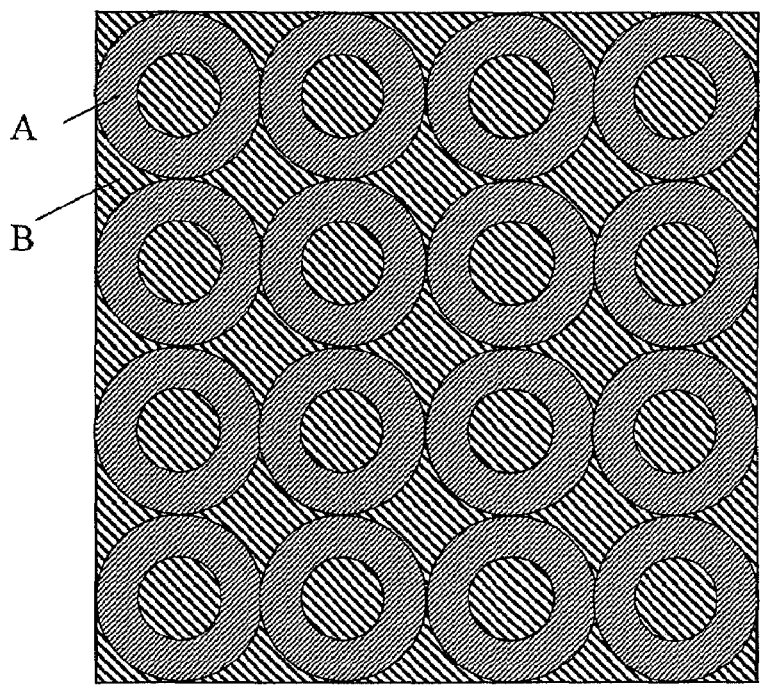

FIG. 11(*a*) is illustrative of an example of the hologram 14, wherein cross-shaped unit holograms A are periodically located in such a way as to come in contact with each other in a row-and-column pattern, and a unit hologram B is located in an octagonal cell defined by four cross-shaped unit holograms A.

FIG. 11(*b*) is illustrative of an example of the hologram 14, wherein annular unit holograms A are periodically located in such a way as to come in contact with each other in a row-and-column pattern, and unit holograms B are located in each annular unit hologram A and a cell defined by four annular unit holograms A.

Figure 12:
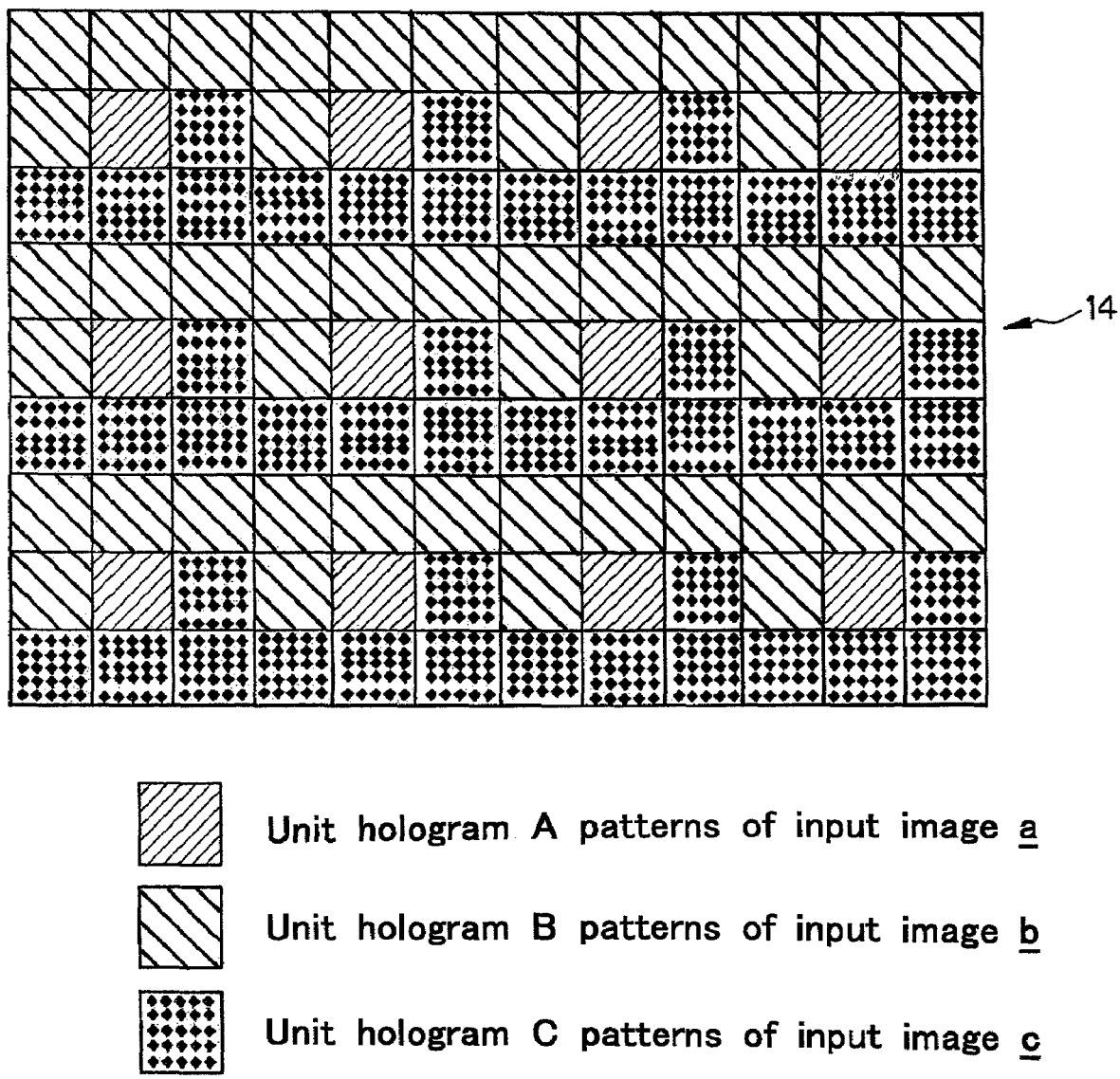
FIG. 12 is illustrative of one example of the array of unit hologram patterns, which enables three reconstructed images to be seen at the same time.
Figure 14A:
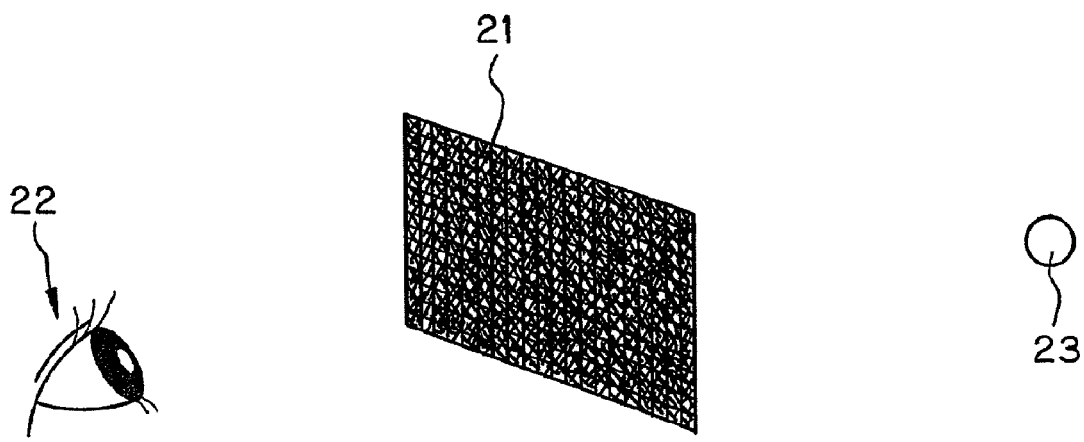
FIG. 14 is illustrative of how one image is reconstructed per light source in the prior art.
Figure 14B:
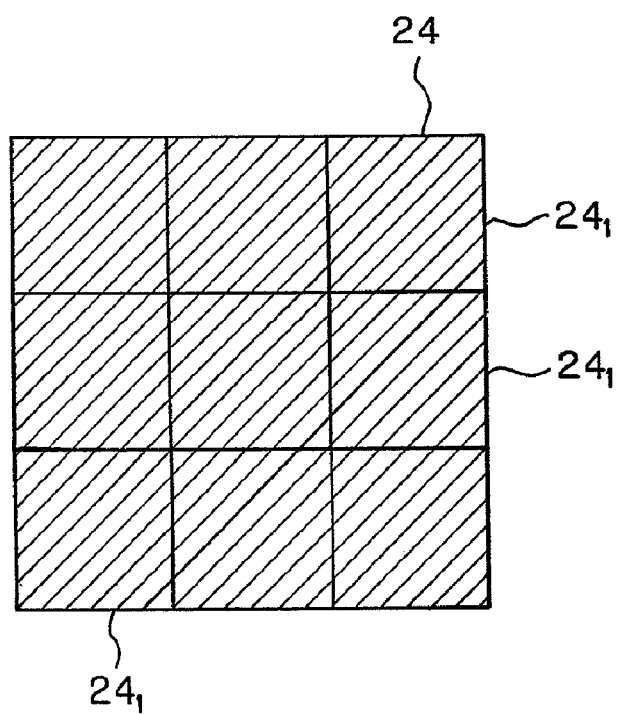
Figure 14C:
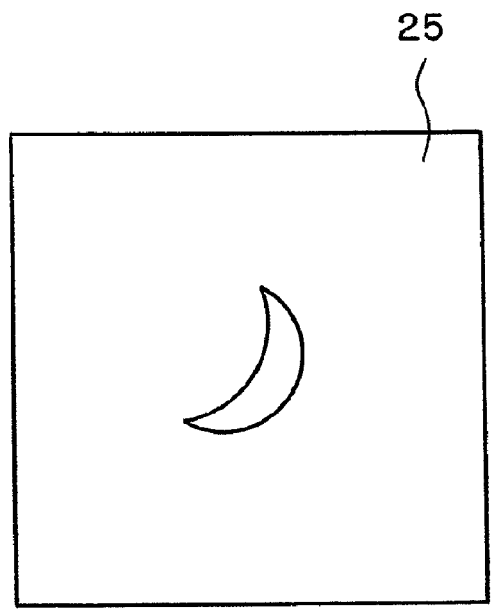
Figure 15A:
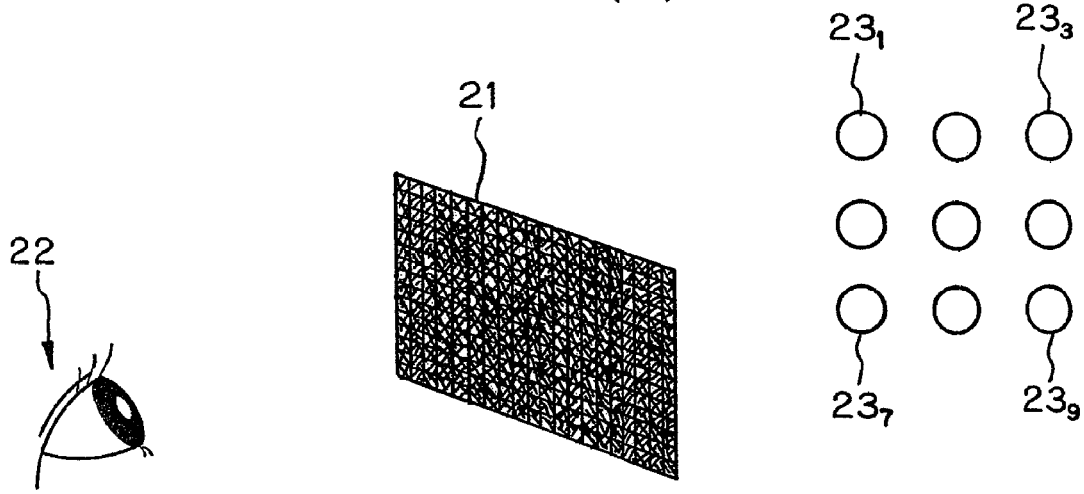
FIG. 15 is illustrative of how as many images as a plurality of light sources are reconstructed in the prior art.
Figure 15B:
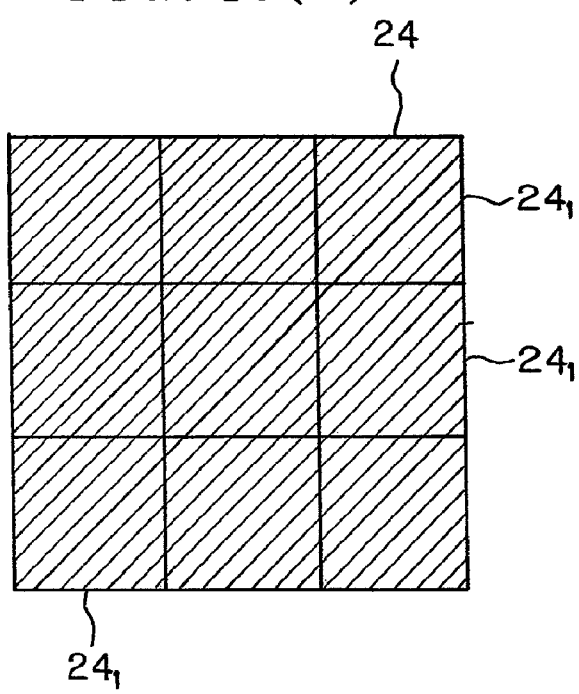
Figure 15C:
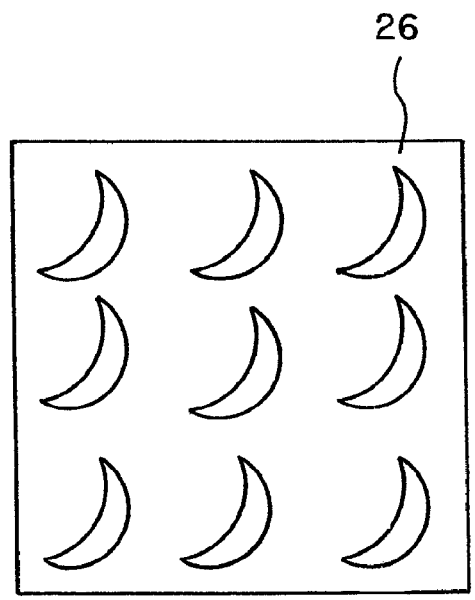

In the examples as mentioned above, two images a and b are used as the input images. As shown in FIG. 12 as an example, however, a unit hologram A pattern, a unit hologram B pattern and a unit hologram C pattern for the reconstruction of three or more images a, b and c could be arrayed in cells, each of square shape, in a rectangular chessboard pattern according to any desired two-dimensional array principle.

It is understood that if two or more unit hologram patterns are arrayed at random rather than regularly, there can then be obtained a hologram 14 capable of reconstructing a more attractive array of images.

In addition, the unit holograms A and B could be used in various shapes and sizes. FIG. 13 is illustrative of one exemplary hologram 14 to this end. As shown, 8 unit holograms B are located around one square unit hologram A of relatively large size, and they are comprised of four rectangular ones and four L-shaped ones.

As described above, no particular limitation is imposed on the shape and two-dimensional array of unit holograms A, B, C, etc. for the hologram 14 of the invention; unit holograms of various shapes could be arrayed according to any desired array method, and unit holograms for the reconstruction of the same image could be provided in combinations of various shapes. However, the size of individual such unit holograms should preferably be such that, as described above, their maximum diameter is in the range of 4 mm to 2L·tan 10°.

The element hologram or holograms 61, 62 that form each unit hologram, too, could be arrayed alone or in any desired combination of a plurality of shapes into unit holograms A, B, C and so on.

The hologram 14 as described above could be fitted in a binocular framework of an eyeglass frame 1 of FIG. 16(*a*) into a holographic viewing device or in another form of framework, for instance, a paper frame into a toy. Furthermore, the hologram 14 could be used while applied to a window glass.

While the hologram of the invention and the holographic viewing device that incorporates it have been explained with several embodiments, it is noted that there could be various modifications to them. It is also noted that the hologram of the invention could be used with a holographic monocle.

I claim:

1. A hologram, which is fabricated by applying Fourier transform to two or more varying input images to obtain a plurality of corresponding Fourier transform images and arraying said Fourier transform images on the same plane according to a given two-dimensional array principle into a computer-generated hologram, wherein when a plurality of point light sources located behind said hologram are viewed through said hologram, said two or more varying images are simultaneously and parallel reconstructed in correspondence to array positions of said plurality of Fourier transform images, wherein said Fourier transform image corresponding to each input image is arrayed alone or parallel in two or more into a unit hologram corresponding to each input image, and unit holograms corresponding to a plurality of input images are arrayed on the same plane on the basis of a given two-dimensional array principle into a computer-generated hologram.

2. The hologram according to claim 1, wherein said plurality of unit holograms be configured into any shape having a maximum diameter of 4 mm to 2L·tan 10° inclusive provided that L is a distance from a viewer's eye to the hologram.

3. A holographic viewing device in which a computer-generated hologram set up as a transmission type Fourier transform hologram is fitted in a framework, wherein said computer-generated hologram is a hologram as recited in claim 2.

4. A holographic viewing device in which a computer-generated hologram set up as a transmission type Fourier transform hologram is fitted in a framework, wherein said computer-generated hologram is a hologram as recited in claim 1.

5. A holographic viewing device in which a computer-generated hologram set up as a transmission type Fourier transform hologram is fitted in a framework, wherein said computer-generated hologram is a hologram, which is fabricated by applying Fourier transform to a plurality of two or more varying input image images to obtain a plurality of corresponding Fourier transform images and arraying said Fourier transform images on the same plane according to a given two-dimensional array principle into a computer-generated hologram, wherein when a plurality of point light sources located behind said hologram are viewed through said hologram, a plurality of said two or more varying images are simultaneously and parallel reconstructed in correspondence to array positions of said plurality of Fourier transform images, wherein said plurality of Fourier transform images are closely arrayed in a region of given shape on the basis of the two-dimensional array principle.

6. A hologram, which is fabricated by applying Fourier transform to two or more varying input images to obtain a plurality of corresponding Fourier transform images and arraying said Fourier transform images on the same plane according to a given two-dimensional array principle into a computer-generated hologram, wherein when a plurality of point light sources located behind said hologram are viewed through said hologram, said two or more varying images are simultaneously and parallel reconstructed in correspondence to array positions of said plurality of Fourier transform images, wherein said plurality of Fourier transform images are closely arrayed in a region of given shape on the basis of the two-dimensional array principle, and wherein said Fourier transform image corresponding to each input image is arrayed alone or parallel in two or more into a unit hologram corresponding to each input image, and unit holograms corresponding to a plurality of input images are arrayed on the same plane on the basis of a given two-dimensional array principle into a computer-generated hologram.

7. A holographic viewing device in which a computer-generated hologram set up as a transmission type Fourier transform hologram is fitted in a framework, wherein said computer-generated hologram is a hologram as recited in claim 6.

8. The hologram according to claim 6, wherein said plurality of unit holograms be configured into any shape having a maximum diameter of 4 mm to 2L·tan 10° inclusive provided that L is a distance from a viewers eye to the hologram.

9. A holographic viewing device in which a computer-generated hologram set up as a transmission type Fourier transform hologram is fitted in a framework, wherein said computer-generated hologram is a hologram as recited in claim 8.

* * * * *